(12) United States Patent
Elder et al.

(10) Patent No.: US 10,232,781 B1
(45) Date of Patent: Mar. 19, 2019

(54) STOWABLE VEHICLE LADDER

(71) Applicant: UTILIMASTER CORPORATION, Bristol, IN (US)

(72) Inventors: Terry L. Elder, Shipshewana, IN (US); Noel F. Cukrowicz, Granger, IN (US)

(73) Assignee: Spartan Motors, Inc., Charolotte, MI (US)

( * ) Notice: Subject to any disclaimer, the term of this patent is extended or adjusted under 35 U.S.C. 154(b) by 0 days.

(21) Appl. No.: 14/732,092

(22) Filed: Jun. 5, 2015

Related U.S. Application Data

(60) Provisional application No. 62/010,138, filed on Jun. 10, 2014.

(51) Int. Cl.
*B60R 3/00* (2006.01)
*B60R 3/02* (2006.01)

(52) U.S. Cl.
CPC .............. *B60R 3/005* (2013.01); *B60R 3/02* (2013.01)

(58) Field of Classification Search
CPC .......... B60R 3/005; B60R 3/007; B60R 3/02; B60R 5/006; B60R 5/02; B60R 5/04

USPC ............................................................ 280/4
See application file for complete search history.

(56) References Cited

U.S. PATENT DOCUMENTS

| | | | |
|---|---|---|---|
| 4,131,293 A * | 12/1978 | Kindle | B60R 3/02 280/166 |
| 2004/0232649 A1 * | 11/2004 | Lambie | B60R 3/007 280/163 |
| 2014/0158465 A1 * | 6/2014 | Salzman | E06C 5/22 182/127 |

* cited by examiner

*Primary Examiner* — Kevin Hurley
*Assistant Examiner* — Felicia L. Brittman
(74) *Attorney, Agent, or Firm* — Barnes & Thornburg LLP

(57) ABSTRACT

A vehicle is provided, having a cargo compartment and a stowable vehicle ladder assembly. The stowable vehicle ladder assembly includes a cavity located on a body portion of the cargo compartment. A ladder is movable between stowed and extended positions with respect to the cavity. The ladder is also selectively recessible in the cavity. A plurality of linkages is pivotally attached to the body portion of the vehicle and the ladder. The plurality of linkages selectively moves the ladder to and from the cavity and to and from stowed and use positions.

27 Claims, 8 Drawing Sheets

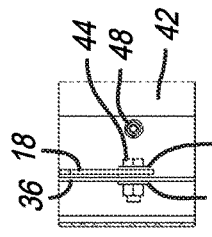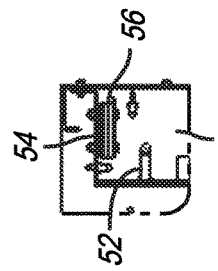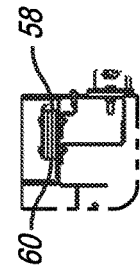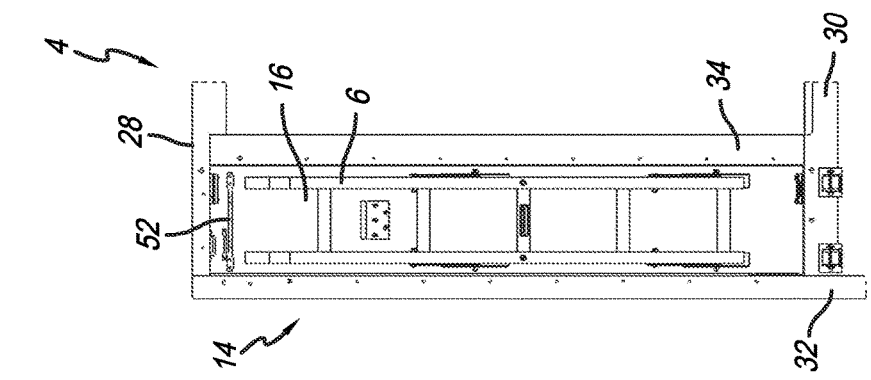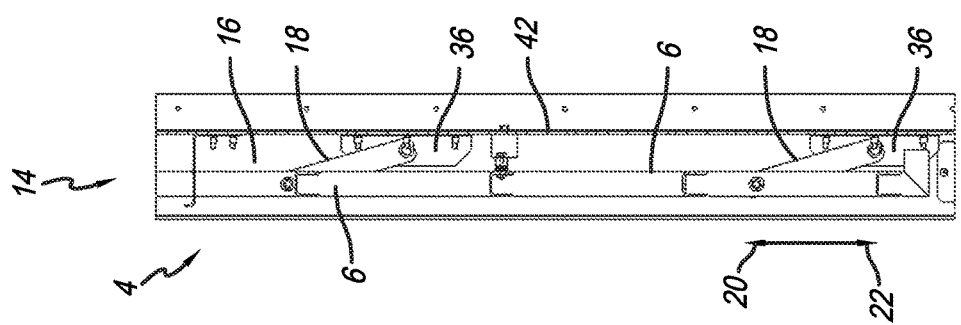

STOWABLE VEHICLE LADDER

RELATED APPLICATIONS

This application claims the benefit of U.S. Provisional Application Ser. No. 62/010,138, filed Jun. 10, 2014, entitled "Stowable Vehicle Ladder" which is hereby incorporated by reference in its entirety.

TECHNICAL FIELD AND SUMMARY

The present disclosure is related to vehicles, and particularly to stowable ladders used on cargo or delivery-type vehicles.

Ladders on vans, trucks, buses, cargo, and delivery vehicles are known. Because these vehicles are much taller than an automobile, accessing the upper portion or roof may become necessary. Conventional vehicle ladders are typically fastened to the outer body surface of the vehicle. In certain circumstances, when security and/or safety are concerns, the ladder may be selectively detached from the outer body surface of the vehicle. The problem with both of these systems is that safety or security is sacrificed for convenience, or vice versa. For example, keeping the ladder fixed on the outer surface of the vehicle makes climbing up at any time very convenient. The problem is so can anyone else—including unauthorized persons. In contrast, by detaching the ladder from the vehicle between each use, it is not available for use by unauthorized persons. Unfortunately attaching and detaching the ladder becomes an added burden to the operator.

The present disclosure describes a ladder assembly for use on a vehicle wherein the ladder is selectively stowable in the vehicle without having to separate it from the vehicle. This ladder is both attached to and movable between use and stowed positions on the vehicle. In its use position, the ladder is exposed and configured to be climbed normally, similar to the fixed vehicle ladder. In contrast, when stowed the ladder is concealed or otherwise rendered not useful for its intended climbing purpose, but still fixed to the vehicle. In an illustrative embodiment, the ladder may be positionable in a recess in the vehicle body concealed behind a door while stowed. Clearly, such a configuration prevents both observation and use of the ladder by unauthorized persons. For purposes of this disclosure, the variety of compatible vehicles will be collectively identified as "vehicle."

Another illustrative embodiment of the present disclosure provides a vehicle comprising a cargo compartment and a stowable vehicle ladder assembly. The stowable vehicle ladder assembly comprises a cavity located on a body portion of the cargo compartment and a ladder movable between stowed and extended positions with respect to the cavity. The ladder includes first and second apart rails and a plurality of spaced apart steps extending between the first and second rails. The ladder is selectively recessible in the cavity. A plurality of linkages is included wherein at least one of the plurality of linkages is pivotally attached to the first rail of the ladder at a first location on the at least one of the plurality of linkages, and at least a second of the plurality of linkages is pivotally attached to the second rail of the ladder at a first location on the at least second of the plurality of linkages. A plurality of brackets is located in the cavity. The at least one of the plurality of linkages is pivotally attached to one of the plurality of brackets in the cavity at a second location on the at least one of the plurality of linkages, and the at least second of the plurality of linkages is pivotally attached to a second of the plurality of brackets in the cavity at a second location on the at least second of the plurality of linkages. These plurality of linkages selectively moves the ladder to and from the cavity and to and from stowed and use positions.

In the above and other illustrative embodiments, the present disclosure may further comprise: the vehicle ladder assembly being configured to allow a person to climb up to access a roof portion of the body portion when the ladder is extended from the cavity, and prevent the person from climbing up to access the roof portion of the body portion when the ladder is moved into the cavity; the plurality of linkages selectively moves the ladder upward and inward into the cavity to the stowed position, and outward and downward from the cavity to the use position; a connector that selectively holds the ladder in the cavity; the plurality of linkages selectively moves the ladder inward into the cavity to the stowed position, and outward from the cavity to the use position; a door that selectively covers the cavity and the ladder; the door being hingedly swingable on the body portion; at least a portion of the cavity in the body portion being formed by a frame; the plurality of brackets is a plurality of angle linkages, wherein the plurality of angle linkages attaches to a back panel in the cavity; a plunger that selectively attaches the ladder assembly to the cavity, wherein pulling on the ladder releases the plunger from the cavity, and pushing on the ladder secures the plunger to the cavity; and a bracket stop located in the cavity that provides a resting point for a portion of the ladder, as well as provides stability, wherein the at least one of the plurality of linkages being located above a vertical midpoint on the ladder and the at least second of the plurality of linkages are located below the vertical midpoint of the ladder.

Another illustrative embodiment of the present disclosure provides a vehicle comprising a cargo compartment and a stowable vehicle ladder assembly. The stowable vehicle ladder assembly comprises a cavity located on a body portion of the cargo compartment; a ladder movable between stowed and extended positions with respect to the cavity; wherein the ladder is selectively recessible in the cavity; a plurality of linkages pivotally attached to the body portion of the vehicle and the ladder; and wherein the plurality of linkages selectively moves the ladder to and from the cavity and to and from stowed and use positions.

In the above and other illustrative embodiments, the present disclosure may further comprise: the vehicle ladder assembly being configured to allow a person to climb up to access a roof portion of the body portion, when the ladder is extended from the cavity, and prevent the person from climbing up to access the roof portion of the body portion when the ladder is moved into the cavity; the plurality of linkages selectively moves the ladder upward and inward into the cavity to the stowed position, and outward and downward from the cavity to the use position; a connector that selectively holds the ladder in the cavity; the plurality of linkages selectively moves the ladder inward into the cavity to the stowed position, and outward from the cavity to the use position; a door that selectively covers the cavity and the ladder; the door being hingedly swingable on the body portion; at least a portion of the cavity in the body portion is formed by a frame; a plurality of angle linkages, wherein the plurality of angle linkages attaches to a back panel in the cavity; a plunger that selectively attaches the ladder assembly to the cavity, wherein pulling on the ladder releases the plunger from the cavity, and pushing on the ladder secures the plunger to the cavity; a bracket stop located in the cavity that provides a resting point for a portion of the ladder, as well as provides stability; and the at least one of the plurality of linkages being located above a vertical midpoint on the ladder and the at least second of the plurality of linkages are located below the vertical midpoint of the ladder.

Another illustrative embodiment of the present disclosure provides a vehicle comprising: a cargo compartment; a ladder movable between stowed and use positions, wherein the ladder is selectively extendable from the vehicle to the use position and recessible toward the vehicle to the stowed position.

In the above and other illustrative embodiments, the present disclosure may further comprise: a plurality of linkages pivotally attached to the body portion of the vehicle and the ladder; and the plurality of linkages selectively move the ladder to and from the cavity and to and from stowed and use positions.

Another illustrative embodiment of the present disclosure provides a vehicle comprising: a cargo compartment; a ladder movable between stowed and use positions; and a means for selectively moving the ladder outward from the vehicle to the use position and inward to the vehicle to the stowed position.

Additional features and advantages of the vehicle with a stowable vehicle ladder will become apparent to those skilled in the art upon consideration of the following detailed descriptions exemplifying the best mode of carrying out the stowable vehicle ladder as presently perceived.

BRIEF DESCRIPTION OF THE DRAWINGS

The present disclosure will be described hereafter with reference to the attached drawings which are given as non-limiting examples only, in which:

FIGS. 5A, 5B, 5C, 5D, 5E, 5F, and 5G show front, side, and various detail views of the ladder and stowage compartment.

DISCLOSURE OF THE ILLUSTRATIVE EMBODIMENT

Figure 1:
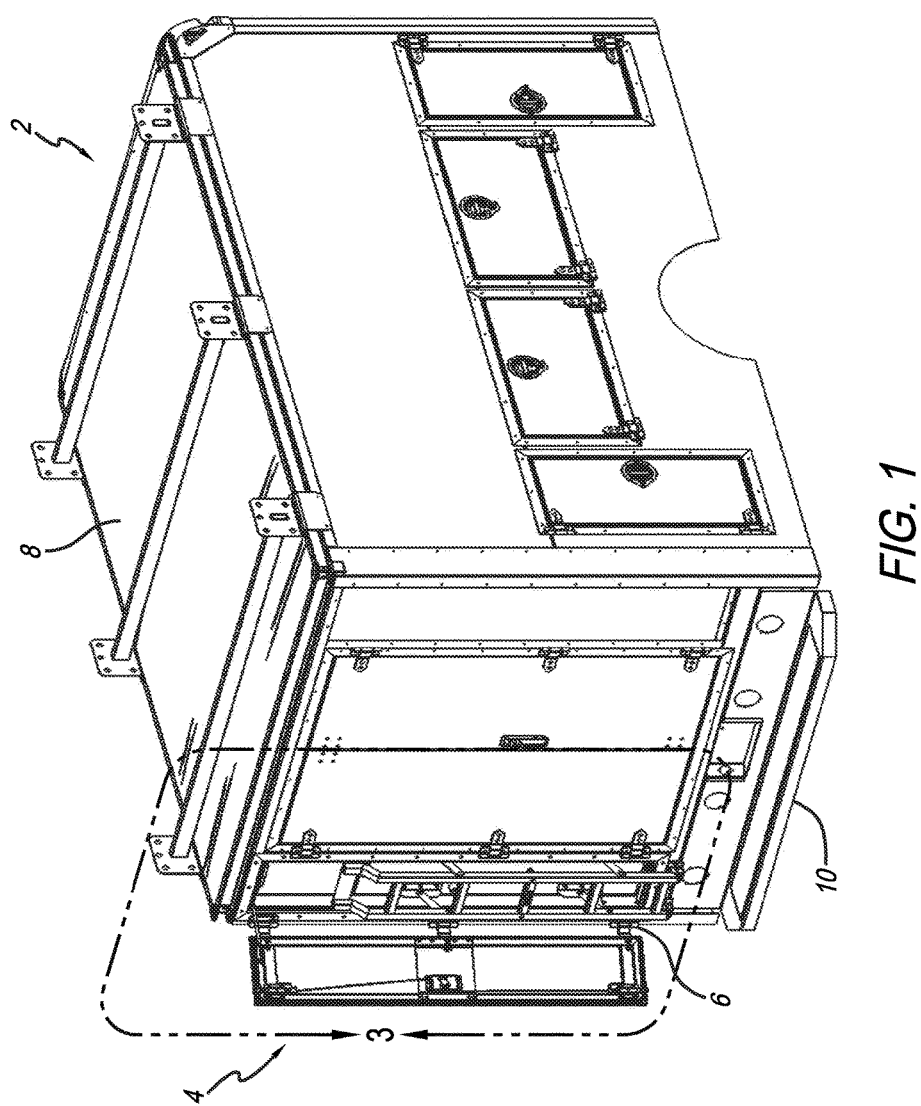
FIG. 1 is a perspective view of a portion of a vehicle body shown with a stowable ladder extended in use position for roof access.

A perspective view of the rear portion of a vehicle body 2 is shown in FIG. 1. Fitted in vehicle body 2 is a stowable ladder assembly 4. Part of stowable ladder assembly 4 is a ladder 6 that is movable between stowed and extended positions. The view shown in FIG. 1 is of ladder 6 and its use position. Here, ladder 6 is extending (although still attached) from vehicle body 2 which allows a person to climb up ladder 6 to access roof portion 8 of vehicle body 2. In this illustrative embodiment, stowable ladder assembly 4 is positioned at a rear portion 10 of vehicle body 2. It is appreciated, however, that ladder assembly 4 may be positioned anywhere on vehicle body 2 that allows both access to a roof portion, as well as able to stow the ladder.

Figure 2:
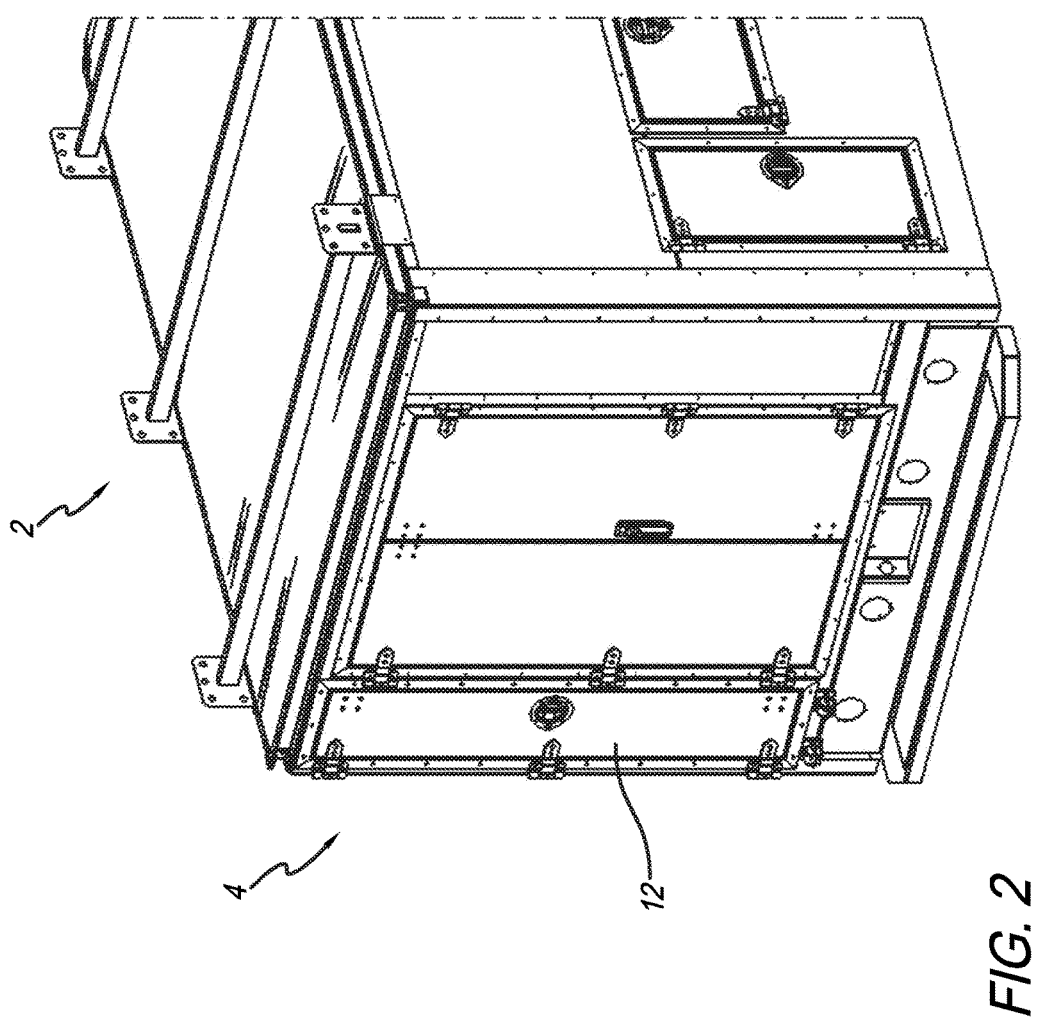
FIG. 2 is another perspective view of a portion of the vehicle body shown with the stowable ladder retracted to prevent roof access.

Another perspective view of vehicle body 2 is shown in FIG. 2 where stowable ladder assembly 4 is located in the stowed position behind door 12. This illustrative embodiment demonstrates how assembly 4 conceals ladder 6 from the exterior vehicle body to prevent unauthorized access. Indeed, it is not even clear that a ladder is used with this vehicle. Only when door 12 is opened and ladder 6 exposed is it clear the functionality exists.

Figure 3:
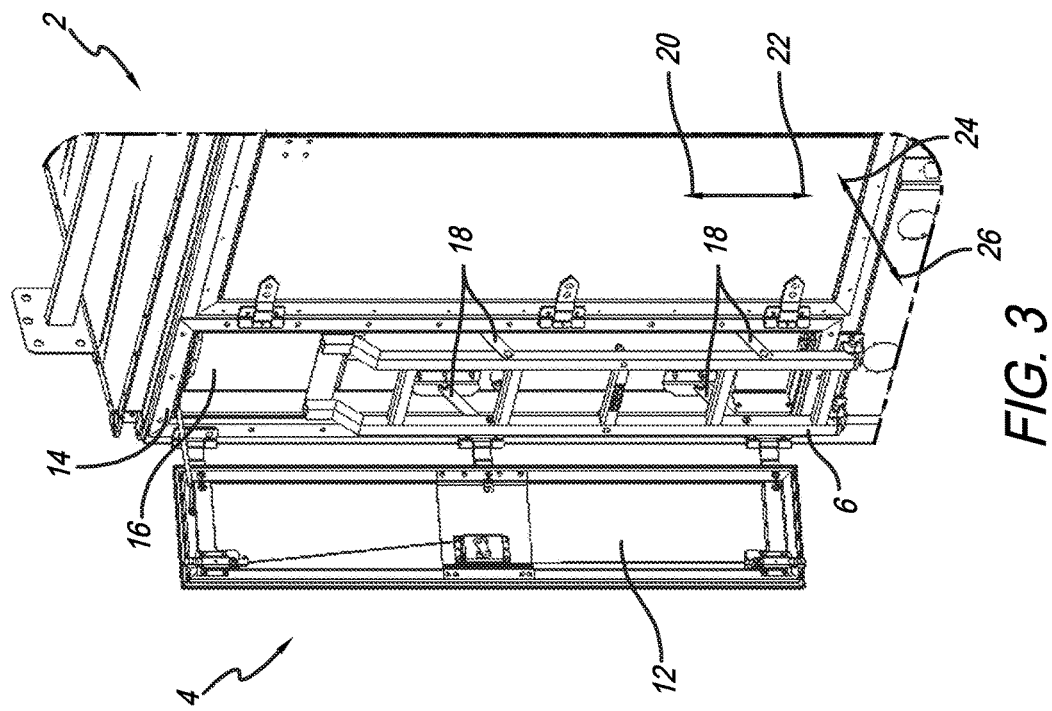
FIG. 3 is another detail view of the vehicle body showing the ladder in its use position.

A detail perspective view of stowable ladder assembly 4 on vehicle body 2 is shown in FIG. 3. In this illustrative embodiment, door 12 is hingeably swingable from vehicle body 2 to expose a frame assembly 14 that forms recessed cavity 16. Ladder 6 is configured to fit in recessed cavity 16. As shown, ladder 6 is attached to frame assembly 14 by linkages 18 that are illustratively pivotable at both ends so ladder 6 may be pushed upward in direction 20. Conversely, ladder 6 also moves in direction 24 causing ladder 6 to fit in recessed cavity 16 of assembly 4. As shown in this view, ladder 6 has been moved in both directions 22 and 26 so that although attached to the vehicle, ladder 6 is extendable from the vehicle enough for a person to climb.

Figure 4A:
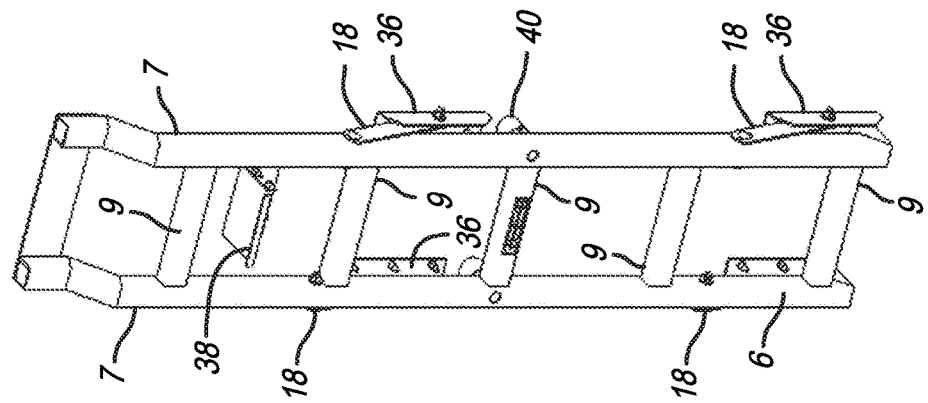
FIGS. 4A, 4B, and 4C show various views of perspective views of the ladder assembly and stowage compartment.
Figure 4B:
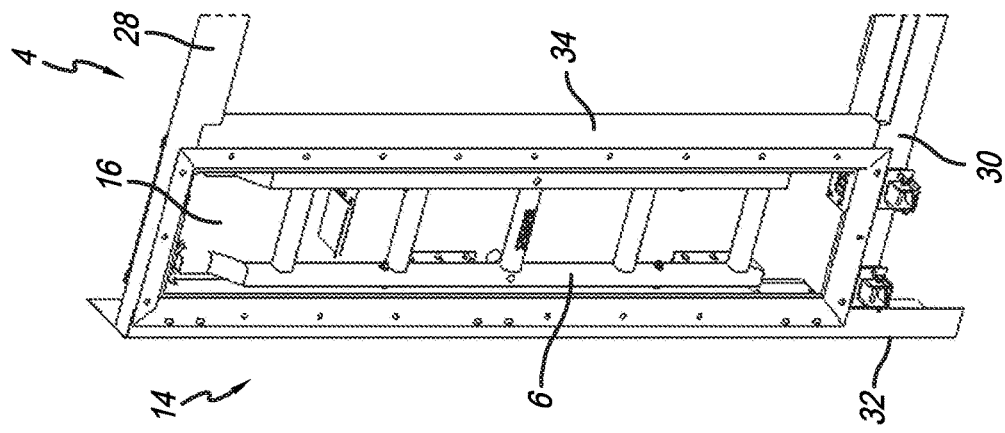
Figure 4C:
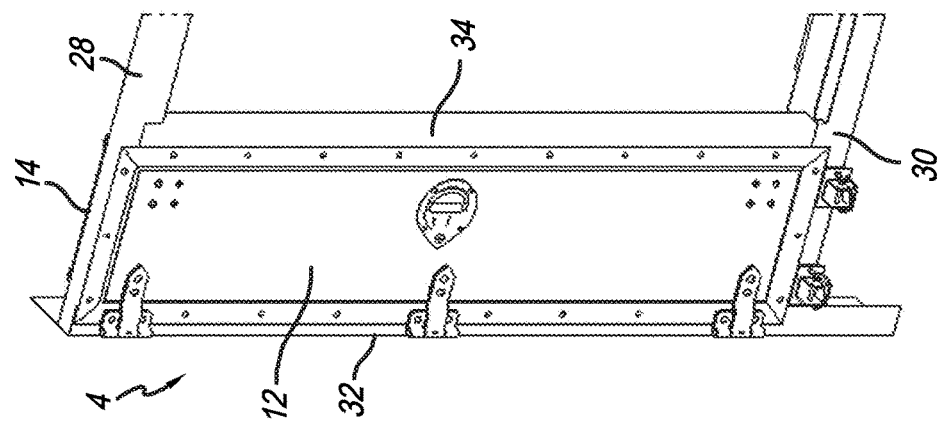

Perspective views of stowable ladder assembly 4 are shown in FIGS. 4A and 4B and ladder 6 in FIG. 4C. As shown in FIG. 4A, door 12 is in the closed position. Components of frame assembly 14, including top and bottom frames 28 and 30 and side frames 32 and 34, surround door 12. The view shown in FIG. 4B is similar to that of FIG. 4A except door 12 is removed to show ladder 6 fitted in recessed cavity 16. The view in FIG. 4C shows ladder 6 along with linkages 18 pivotally attached thereto. Ladder 6 is shown composed of rails 7, spaced apart by steps 9. An angle linkage 36 is pivotally attached to each linkage 18 and serves as an illustrative attachment to frame assembly 14. Bracket stop 38 provides a resting point for the top portion of ladder 6 and adds stability. In this illustrative embodiment, ladder 6 may also include plungers 40 attached thereto for reducing impact forces on ladder 6 when moved to its stowed position as shown in FIG. 4B. This also helps ensure proper placement of ladder 6 in recessed cavity 16.

Figure 5G:
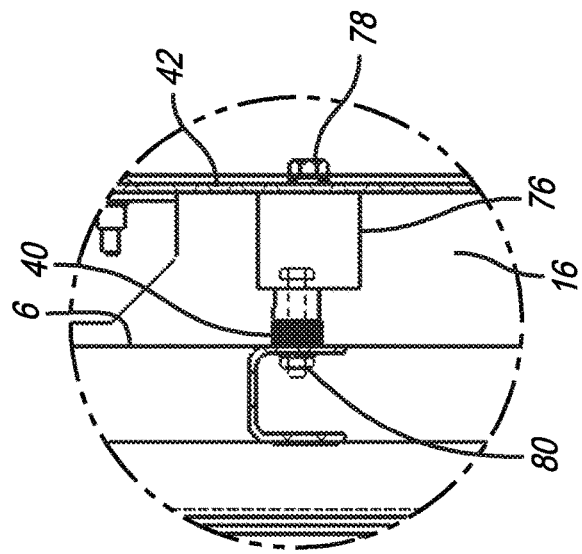

Various front, side, cutaway, and detail views of stowable ladder assembly 4 are shown in FIGS. 5A, 5B, 5C, 5D, 5E, 5F, and 5G. The cross-sectional view of FIG. 5A taken from a portion of FIG. 5B shows how ladder 6 fits within recessed cavity 16 of frame assembly 14. This view also shows the arrangement of linkages 18 and how pushing up on ladder 6 in direction 20 reduces its distance from back panel 42, thereby fitting into recessed cavity 16. Also shown are angle linkages 36 which pivotally attach to linkages 18, as well as attach to back panel 42. This illustratively provides securement between frame assembly 14 and ladder 6.

A front view of stowable ladder assembly 4 is shown in FIG. 5B, further depicting how ladder 6 fits into recessed cavity 16 within the confines of frame assembly 14. This view, similar to the others, shows how top and bottom frames 28 and 30, along with side frames 32 and 34, bound ladder 6. The detail view of FIG. 5C demonstrates how linkage 18 pivotally attaches to angle bracket 36 via fastener 44. Illustratively, washers 46 may be placed as shown to assist providing pivoting function for linkage 18. This embodiment further includes a fastener 48 attaching angle linkage 36 to back panel 42. A handle 52, as shown in FIGS. 5B and 5D, is attached to recessed cavity 16 to provide an additional grip for allowing safe access to the roof of the vehicle. A detail view of a door latch striker plate 54 is shown in FIG. 5D. Striker plate 54 is in assembled position with shim plates 56 to properly adjust for door 12. A detailed view of striker plate 58 at the bottom of ladder assembly 4 is shown in FIG. 5E. This view also shows shim plates 60 similar to shim plate 56.

Figure 5F:
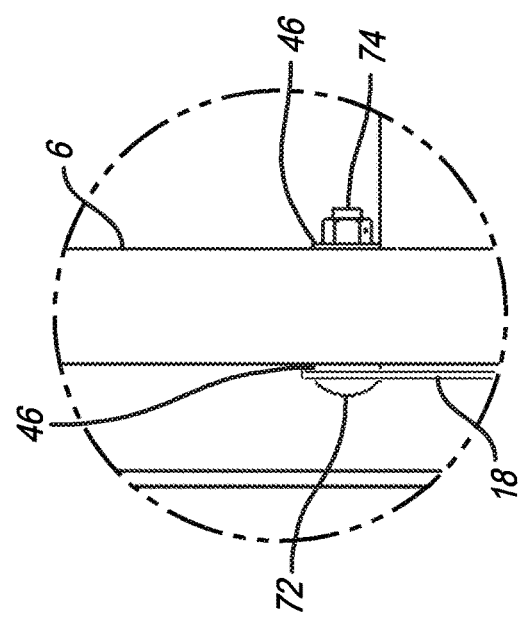

A detail view of a portion of ladder assembly 4 is shown in FIG. 5F. This view shows how a fastener 72 pivotally attaches linkage 18 to ladder 6. Washers 46 are shown assisting in the pivoting movement. Fastener 72 is illustratively attached via a nut 74. Another detail view of ladder 6 is shown in FIG. 5G. This view shows how plunger 40 couples with receptacle 76 to provide a securement for ladder 6 in recessed cavity 16. Receptacle 76 is attached to back panel 42 illustratively via fastener 78. Plunger 40 is attached to ladder 6 via fastener 80. When ladder 6 is stowed in recessed cavity 16, plunger 40 engages receptacle 76. When it is desired to move ladder 6 to its extended use position, the operator may pull plunger 40 away allowing ladder 6 to extend from recessed cavity 16.

Figure 6C:
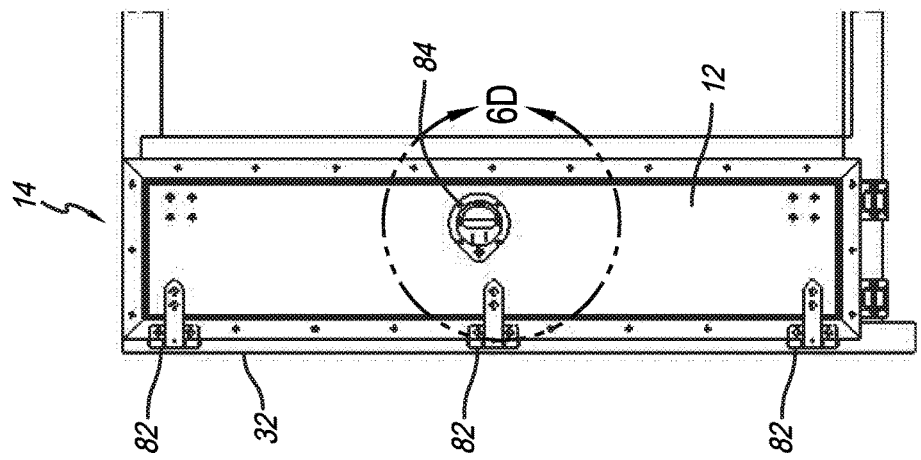
FIGS. 6A, 6B, 6C, 6D, and 6E show various views of the ladder stowage compartment.
Figure 6B:
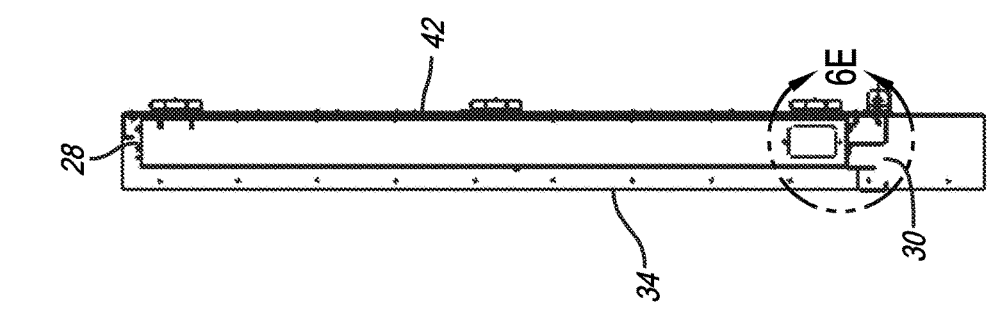
Figure 6A:
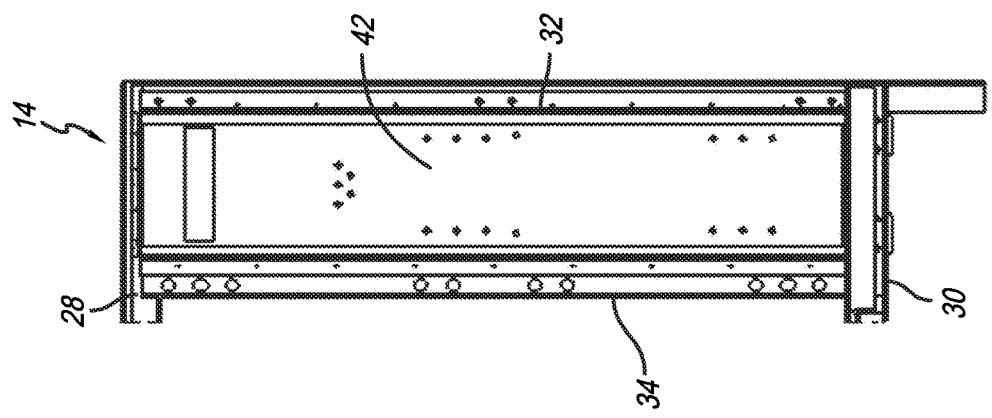
Figure 6E:
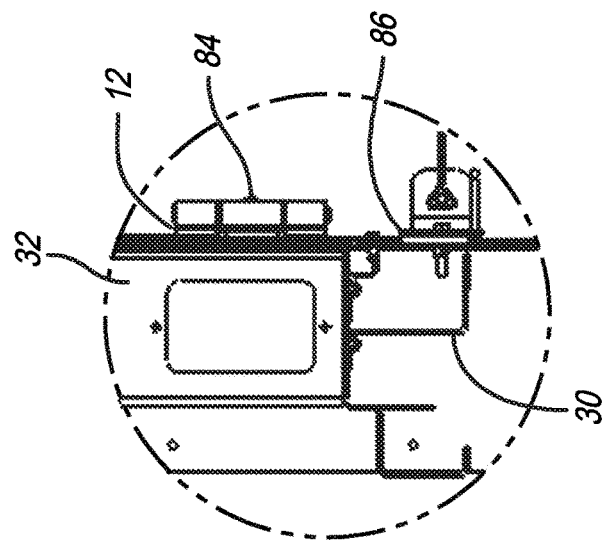
Figure 6D:
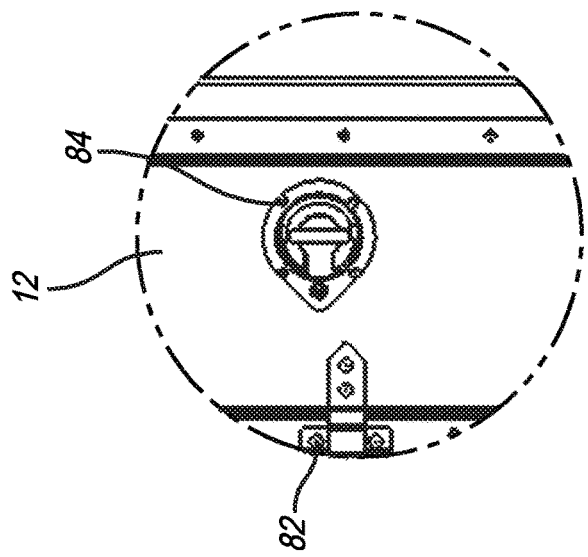

Various views of frame assembly 14 are shown in FIGS. 6A, 6B, 6C, 6D, and 6E. FIG. 6A shows an illustrative embodiment of top and bottom frames 28 and 30 attached to side frames 32 and 34. Back panel 42 extends between frames 28 through 34. This view shows the various holes that can be formed in the several members 28 through 34 and back panel 42 in order to attach the various structures making up ladder assembly 4. The side view in FIG. 6B illustratively shows top and bottom panels 28 and 30 along with side panel 34 and back panel 42. The forward-looking view of assembly 14 shown in FIG. 6C includes door 12 attached to side member 32 via hinges 82. The detailed view of FIG. 6C depicts the illustrative configuration of hinge 82 attached to side member 32 and door 12. It is appreciated that the hinge configuration is illustrative only and this teaching demonstrates other configurations are possible and are within the scope of this disclosure. Also shown in both FIGS. 6C and 6D is door latch 84. Again, this door latch is illustrative and other such latches used on access doors for vehicles may be used as a latch for door 12, and all are within the scope of this disclosure. The detail view in FIG. 6E shows the lower portion of frame assembly 14, including side frame 32 with hinge 84 attached to door 12 along with lower frame member 30 with a lower ladder stop 86 that includes a snap pin to physically lock ladder 6 in place during operational use.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A vehicle comprising:
    a cargo compartment having a floor, a plurality of upward-extending side walls, and a roof connected to the plurality of upward-extending walls to form a cargo space in the cargo compartment;
    a stowable vehicle ladder assembly which comprises:
    a recessed cavity formed in one of the plurality of upward-extending side walls;
    wherein the recessed cavity is formed by a plurality of cavity walls extending adjacent the floor and the roof of the cargo compartment;
    wherein the recessed cavity opens substantially flush with the one of the plurality of upward-extending side walls exterior of the cargo space;
    a ladder movable between stowed and extended positions with respect to the recessed cavity;
    wherein the ladder includes first and second spaced apart rails and a plurality of spaced apart steps extending between the first and second spaced apart rails; and;
    a plurality of linkages;
    wherein a first of the plurality of linkages includes a first pivot point that pivotally couples to the ladder and a second pivot point that pivotally couples to at least one of the plurality of cavity walls;
    wherein the second pivot point on the first of the plurality of linkages is spaced apart from the first pivot point on the first of the plurality of linkages;
    wherein the ladder is pivotable with respect to the first pivot point of the first of the plurality of linkages, and the first of the plurality of linkages is pivotable at the second pivot point with respect to the at least one of the plurality of cavity walls of the recessed cavity;
    wherein the ladder is selectively extended from the recessed cavity by moving the first of the plurality of linkages at its first and second pivot points; and
    wherein the ladder is selectively stowed into the recessed cavity by moving the first of the plurality of linkages at its first and second pivot points.

2. The vehicle of claim 1, wherein the stowable vehicle ladder assembly is configured to allow a person to climb up to access a roof portion of the cargo compartment, when the ladder is extended from the cavity, and prevent the person from climbing up to access the roof portion of the body portion when the ladder is moved into the cavity.

3. The vehicle of claim 1, wherein the plurality of linkages enable the ladder and the first and second spaced apart rails to selectively move upward and inward into the cavity to the stowed position, and outward and downward from the cavity to the use position.

4. The vehicle of claim 1, further comprising a connector that selectively holds the ladder in the cavity.

5. The vehicle of claim 1, wherein the plurality of linkages enable the ladder and the first and second spaced apart rails to selectively move inward into the cavity to the stowed position, and outward from the cavity to the use position.

6. The vehicle of claim 1, further comprising a door that selectively conceals the cavity and the ladder.

7. The vehicle of claim 6, wherein the door is hingedly swingable on the cargo compartment.

8. The vehicle of claim 1, wherein at least a portion of the cavity in the cargo compartment is formed by a frame.

9. The vehicle of claim 1, wherein the plurality of brackets is a plurality of angle linkages, wherein the plurality of angle linkages attaches to a back panel in the cavity.

10. The vehicle of claim 1, further comprising a plunger that selectively couples the ladder assembly to the cavity, wherein pulling on the ladder releases the plunger from the cavity, and pushing on the ladder secures the plunger to the cavity.

11. The vehicle of claim 1, further comprising a bracket stop located in the cavity that provides a resting point for a portion of the ladder, as well as provides stability.

12. The vehicle of claim 1, wherein the at least one of the plurality of linkages is located above a vertical midpoint on the ladder, and the at least second of the plurality of linkages is located below the vertical midpoint of the ladder.

13. A vehicle comprising:
    a cargo compartment;
    a stowable vehicle ladder assembly which comprises:
    a cavity located on a body portion of the cargo compartment;

a ladder movable between stowed and extended positions with respect to the cavity;

wherein the ladder is mounted onto a surface of the cavity;

wherein the ladder is selectively recessible in the cavity;

first and second hand rails fixedly attached to the ladder and are movable with the ladder between the stowed and extended positions; and a plurality of linkages pivotally attached to the body portion of the vehicle and the ladder;

wherein the plurality of linkages selectively move to enable the ladder and the first and second hand rails to move to and from the cavity and to and from stowed and use positions; and wherein at least one of the plurality of linkages is located above a vertical midpoint on the ladder, and at least a second of the plurality of linkages is located below the vertical midpoint of the ladder.

14. The vehicle of claim 13, wherein the stowable vehicle ladder assembly is configured to allow a person to climb up to access a roof portion of the body portion, when the ladder is extended from the cavity, and prevent the person from climbing up to access the roof portion of the body portion when the ladder is moved in to the cavity.

15. The vehicle of claim 13, wherein the plurality of linkages enable the ladder and the first and second hand rails to selectively move upward and inward into the cavity to the stowed position, and outward and downward from the cavity to the use position.

16. The vehicle of claim 13, further comprising a connector that selectively holds the ladder in the cavity.

17. The vehicle of claim 13, wherein the plurality of linkages enable the ladder and the first and second hand rails to selectively move inward into the cavity to the stowed position, and outward from the cavity to the use position.

18. The vehicle of claim 13, further comprising a door that selectively covers the cavity and the ladder.

19. The vehicle of claim 18, wherein the door is hingedly swingable on the body portion.

20. The vehicle of claim 13, wherein at least a portion of the cavity in the body portion is formed by a frame.

21. The vehicle of claim 13, further comprising a plurality of angle linkages, wherein the plurality of angle linkages attaches to a back panel in the cavity.

22. The vehicle of claim 13, further comprising a plunger that selectively couples the ladder assembly to the cavity, wherein pulling on the ladder releases the plunger from the cavity, and pushing on the ladder secures the plunger to the cavity.

23. The vehicle of claim 13, further comprising a bracket stop located in the cavity that provides a resting point for a portion of the ladder, as well as provides stability.

24. The vehicle of claim 13, wherein the at least one of the plurality of linkages is located above a vertical midpoint on the ladder, and at least the second of the plurality of linkages is located below the vertical midpoint of the ladder.

25. A vehicle comprising:
a cargo compartment;
a ladder movable between stowed and use positions;
wherein the ladder is mounted onto a surface of a cavity;
wherein the ladder is selectively extendable both laterally and vertically from the cavity to the use position and recessible toward the cavity to the stowed position; and
a plurality of linkages pivotally attached to the surface of the cavity and the ladder;
wherein at least one of the plurality of linkages is located above a vertical midpoint on the ladder, and at least a second of the plurality of linkages is located below the vertical midpoint of the ladder.

26. The vehicle of claim 25, wherein the plurality of linkages selectively moves to enable the ladder and first and second hand rails to move to and from the cavity and to and from stowed and use positions.

27. A vehicle comprising:
a cargo compartment having a floor, a plurality of upward-extending side walls, and a roof connected to the plurality of upward-extending walls to form a cargo space in the cargo compartment;
a recessed cavity formed in one of the plurality of upward-extending side walls;
wherein the recessed cavity is formed by a plurality of cavity walls extending adjacent the floor and the roof of the cargo compartment;
wherein the recessed cavity opens substantially flush with the one of the plurality of upward-extending side walls exterior of the cargo space;
a movable door that selectively shrouds the recessed cavity when in a closed position and exposes the recessed cavity when in an open position;
a stowable ladder movable between stowed and extended positions with respect to the recessed cavity;
wherein the stowable ladder includes first and second spaced apart rails and a plurality of spaced apart steps extending between the first and second spaced apart rails;
wherein the stowable ladder is selectively extended from the recessed cavity when the movable door is located in the open position;
wherein the stowable ladder is located proximal to the roof when selectively extended from the recessed cavity;
wherein the stowable ladder is selectively stowed in the recessed cavity by moving the ladder toward the recessed cavity; and
wherein the stowable ladder is not accessible by a user when the ladder is selectively stowed in the recessed cavity and the movable door is located in the closed position.

* * * * *